United States Patent [19]

Yamashita et al.

[11] Patent Number: 5,691,779
[45] Date of Patent: Nov. 25, 1997

[54] COLOR CONVERSION APPARATUS THAT RESTRICTS THE COLOR REPRODUCTION RANGE OF PRIMARY COLOR SIGNALS

[75] Inventors: Haruo Yamashita, Ibaraki; Tsumoru Fukushima, Kyoto, both of Japan

[73] Assignee: Matsushita Electric Industrial Co., Ltd., Osaka, Japan

[21] Appl. No.: 764,184

[22] Filed: Dec. 13, 1996

Related U.S. Application Data

[62] Division of Ser. No. 421,930, Apr. 14, 1995, Pat. No. 5,619,280.

[30] Foreign Application Priority Data

Apr. 14, 1994 [JP] Japan ......................... 6-75848

[51] Int. Cl.$^6$ ......................................... H04N 9/68
[52] U.S. Cl. .................. 348/645; 348/649; 348/661
[58] Field of Search ..................... 348/645, 659, 348/660, 661, 649, 646, 651; 358/518, 520, 27, 28, 30; 382/162, 167; 345/150, 153, 154; H04N 9/67, 9/68, 9/64

[56] References Cited

U.S. PATENT DOCUMENTS

| | | |
|---|---|---|
| 4,499,486 | 2/1985 | Favreau . |
| 4,712,132 | 12/1987 | Soca . |
| 5,319,448 | 6/1994 | Ohki ..................... 348/645 |

FOREIGN PATENT DOCUMENTS

| | | |
|---|---|---|
| 67083 | 12/1982 | European Pat. Off. . |
| 647069 | 4/1995 | European Pat. Off. . |
| 2575884 | 7/1986 | France . |
| 61-288690 | 12/1986 | Japan . |
| 2264025 | 8/1993 | United Kingdom . |

Primary Examiner—Sherrie Hsia
Attorney, Agent, or Firm—McDermott, Will & Emery

[57] ABSTRACT

The present invention provides color conversion apparatus that prevents overflow in color reproduction, changes in hue, and the deterioration of gradation to improve image quality. The present color conversion apparatus inputs to itself luminance and color difference signals, sets a reference value not less than the maximum level of the luminance signal, converts the luminance and color difference signals into primary color signals, detects the maximum value of the primary color signals for each pixel, lowers the levels of the color difference signals if the maximum value is over the reference value to locate the amplitude of the primary color signals not greater than the reference value. Further, the present color conversion apparatus inputs to itself luminance and color difference signals, sets a reference value not greater than the minimum level of the luminance signal, converts the luminance and color difference signals into primary color signals, detects the minimum value of the primary color signals for each pixel, lowers the amplitudes of the color difference signals if the minimum value is under the reference value to locate the amplitude of the primary color signals not less than the reference value.

1 Claim, 12 Drawing Sheets

COLOR CONVERSION APPARATUS THAT RESTRICTS THE COLOR REPRODUCTION RANGE OF PRIMARY COLOR SIGNALS

This is a divisional of application Ser. No. 08/421,930, filed Apr. 14, 1995, U.S. Pat. No. 5,619,280.

BACKGROUND OF THE INVENTION

1. Field of the Invention

The present invention relates to a color conversion apparatus that converts a video signal in equipment that deals with a video signal in a form separated into luminance and chroma signals, so that color information expressed by the video signal does not exceed the color reproduction range of primary color signals.

2. Description of the Related Art

Color information is usually expressed in a signal form using the CIE-recommended L*u*v* or L*a*b uniform color space or in a signal form called luminance and color difference signals such as (Y, U, V) and (Y, R–Y, B–Y) widely used in video equipment. All these expressions consist of a signal expressing lightness and a chromaticity vector expressing hue and saturation. Since lightness, hue, and saturation are easily perceived and understood by humans, they are easily varied for adjustment. Further, the chromaticity components that are hard to be perceived by human vision because of their high spatial frequency can be discarded by band restriction, so that the transmission band and memory capacity can be reduced. All these signals are generally called luminance and chroma signals.

On the other hand, there exists a signal form of so called primary color signals such as R (red), G (green), and B (blue) signals. These signals correspond to primary colors of physical light. They do not correspond to human vision, but are easy to handle for designing equipment, so that they are used in equipments not requiring color adjustment but emphasizing image quality, in particular, equipments where compatibility with computers is essential.

Further, these two types of signal forms often coexist in a single piece of equipment. For example, at a unit of adjusting color and gradation in an equipment that mainly processes primary color signals, primary color signals are locally converted into luminance and chroma signals to be processed and then reconverted into primary color signals. The conversion and reconversion are sometimes performed several times in a single piece of equipment.

However, color reproduction ranges expressed by these signal forms are different from each other. Therefore, while conversion from a signal form having a narrower color reproduction range into a signal form having a wider color reproduction range is performed without any limitation, color and gradation overflow in conversion from a signal form having a wider color reproduction range into a signal form having a narrower color reproduction range resulting in the degradation of image quality. Moreover, between two signal forms A and B, A may have a wider color reproduction range than B in some hue, and B may have a wider color reproduction range than B in another hue.

Luminance and chroma signals, which have a wider color reproduction range than RGB primary signals, are often used in a unit requiring color adjustment as described above. An adjusted color is expressed in luminance and chroma signals, but may be beyond the color reproduction range of RGB signals. If the color can not be expressed by RGB signals, then it can not be output by a physical apparatus, so that overflow in color and gradation occurs.

In case of television, the adjustment of raising saturation to make a color dense is performed by expanding the amplitude of color differences by increasing the chroma gain. This method is effective for input colors having a low saturation. However, if a color having great color differences, then even if the adjusted color does not overflow in luminance and color difference signals, it may exceed predetermined maximum levels or become negative when they are converted into RGB signals for activating a CRT. The converted signals are clipped in practice, so that overflow in color and gradation described above occurs causing changes in hue and saturation and deterioration of gradation due to false contours.

Prior arts have been obliged to respond to this problem by setting contrast and saturation low. But it has been difficult to eliminate overflow, and inadequate dark colors have been displayed without sufficiently utilizing the color reproduction range.

Next, the above problem is described in more detail with reference to FIG. 13 that shows a color adjustment circuit. FIG. 13 illustrates a configuration of an adjustment circuit that performs adjustment of lightness, hue, and saturation for luminance and color difference signals. A reference numeral 90 denotes a gain adjustment circuit, 91 denotes a matrix circuit for adjusting the hue and saturation of color difference signals, and 92 denotes an RGB conversion circuit that converts the adjusted luminance and color difference signals into RGB signals.

The operation of the adjustment circuit is exemplified in the following with consideration of signal levels. Relationships among luminance and color difference levels and RGB levels in the NTSC system are given by equations (1), (2), and (5).

$$Y = 0.3 \cdot R + 0.59 \cdot G + 0.11 \cdot B \tag{1}$$

$$G - Y = -0.5085 \cdot (R-Y) - 0.1864 \cdot (B-Y) \tag{2}$$

$$(R-Y)' = a0 \cdot (R-Y) + a1 \cdot (B-Y),$$

$$(B-Y)' = a2 \cdot (R-Y) + a3 \cdot (B-Y). \tag{3}$$

$$a0 = h \cdot \cos w$$

$$a1 = h \cdot \sin w$$

$$a2 = -h \cdot \sin w$$

$$a3 = h \cdot \cos w \tag{4}$$

$$R = (R-Y) + Y$$

$$G = -0.5085 \cdot (R-Y) - 0.1864 \cdot (B-Y) + Y$$

$$B = (B-Y) + Y \tag{5}$$

First, adjustments of the lightness of an image are shown in Tables 1-A and 1-B. The input colors 1 and 2 are yellow (Y=0.69, R–Y=0.06, B–Y=–0.49) and bluish cyan (Y=0.666, R–Y=–0.466, B–Y=0.284), and the luminance levels of both colors are around 0.7, an intermediate lightness. Now, if the luminance of both signals are increased into 1.3 times the original ones, the Y levels become a little under 0.9, so that they do not overflow. However, when converted into RGB signals, the RGB levels of the input color 1 are all below 1, but the G and B levels of the input color 2 are over 1 so that they exceed the reproduction range. In practice, the RGB signals beyond level 1 are limited below 1 somewhere in the processing system, and a saturated color shown in the last column of Table 1-B, where G=B=1, is reproduced. The Y level of the saturated color is 0.822, a little under the desired level 0.866, and the levels of the color difference signals, in particular the amplitude of B–Y, become greatly reduced, so that the original bluish cyan changes into purer cyan.

TABLE 1-A

|   | Input color 1 | 1.3 · Y |
|---|---|---|
| R | 0.75 | 0.96 |
| G | 0.75 | 0.96 |
| B | 0.2 | 0.41 |
| Y | 0.69 | 0.90 |
| R_Y | 0.06 | 0.06 |
| G-Y | 0.06 | 0.06 |
| B-Y | –0.49 | –0.49 |
|   | Yellow | Yellow |

TABLE 1-B

|   | Input color 2 | 1.3 · Y | Limit |
|---|---|---|---|
| R | 0.2 | 0.40 | 0.40 |
| G | 0.85 | 1.05 | 1.0 |
| B | 0.95 | 1.15 | 1.0 |
| Y | 0.666 | 0.866 | 0.82 |
| R-Y | –0.466 | –0.466 | –0.42 |
| G-Y | 0.184 | 0.184 | 0.18 |
| B-Y | 0.284 | 0.284 | 0.18 |
|   | Bluish cyan |   | Cyan |

Examples in case lightness is changed have been described above. If saturation is expanded, or even if hue is uniformly rotated by processing the color difference signals through a matrix means, overflow at the RGB levels occurs depending on the color. The reason is that the reproduction range of lightness and saturation in the RGB space greatly varies with hue. Not only the RGB levels often exceed their reproducible maximum levels in the color adjustment operation but also sometimes become negative.

Overflow in color reproduction in conversion into primary color signals have been described above with examples of color adjustment. More generally, the same kind of image degradation occurs whenever conversion between signals having different color reproduction ranges is performed.

As mentioned before, prior arts have responded to this problem by moderately setting contrast and saturation to reduce bad effects. An additional method proposed that a reproduced color is determined as a point where the straight line connecting a color point outside a color reproduction range with white color point intercepts the boundary of a color reproduction range (Japanese Pat. Kokai Sho 61-288690).

As described above, when luminance and chroma signals or luminance and color difference signals are converted into primary color signals, the color reproduction range of primary color signals is exceeded, that is, one or more of the primary signals often exceed the reproducible maximum levels or become negative, so that the converted primary signals are clipped with the maximum or zero level. As a result, color reproduction overflows, false contours occur with deterioration of gradation, and hue, saturation, and lightness change. The fact that luminance and chroma signals or luminance and color difference signals exceed the color reproduction range of primary color signals often occurs when luminance, hue, lightness and the like are adjusted. The fact also occurs even if color adjustments are not performed when the color reproduction range of primary color signals is relatively narrow.

Prior arts have tried to prevent overflow in color reproduction based on experience by lowering saturation and contrast in luminance and chroma signals and luminance and color difference signals. But the saturation of not-overflowing colors also declines and the whole image becomes dark, so that accurate color reproduction can not be expected, and overflow in particular colors still occur unless saturation is set exceedingly low.

Further, the Japanese Pat. Kokai Sho 61-288690, which aims to solve these problems, calculates a color reproduction range of complex shape in the chromaticity diagram, judges which of the six color regions R, G, B, C, M, Y an input color belongs to, judges if the input color exceeds the color reproduction range, and obtains the intersection of the boundary of the color range and the obtained hue. Further, the color reproduction range in the chromaticity diagram varies with lightness, so that obtaining the color reproduction range requires very complex calculation. Therefore, the method is hard to implement by hardware, and even if it is implemented by software, the processing time becomes very long, so that implementation in an actual apparatus has been very difficult.

SUMMARY OF THE INVENTION

An object of the present invention is therefore to provide methods and apparatus for color conversion that do not require complex judgements, can be easily implemented by hardware, and can prevent overflow in color reproduction in primary color signals after various color adjustments in luminance and chroma signals or luminance and color difference signals.

In order to achieve the aforementioned objective, the present invention inputs to itself luminance and color difference signals, sets a predetermined level not less than the maximum amplitude of the luminance signal, converts the luminance and color difference signals into primary color signals, detects the maximum value of the three primary color signals for each pixel, and lowers the amplitude of the color difference signals, if the maximum value exceeds the predetermined level, so that the amplitudes of the three primary color signals are kept not greater than the predetermined level.

Further, the present invention inputs a video signal consisting of a luminance signal and two color difference signals, sets a predetermined level not less than the maximum amplitude of the luminance signal, generates a third color difference signal from the two color difference signals, detects the maximum value of the three color difference signals for each pixel, and attenuates the amplitudes of the first and second color difference signals with an identical gain if the maximum value exceeds the difference between the predetermined level and the value of the luminance signal, so that when the video signal is converted into primary color signals, the amplitudes of the three primary signals are kept not greater than the predetermined level.

Still further, the present invention inputs to itself luminance and chroma signals, sets a predetermined level not greater than the minimum amplitude of the luminance signal, converts the luminance and chroma signals into primary color signals, detects the minimum value of the three primary signals for each pixel, and lowers the amplitude of the chroma signals, if the minimum value falls below the predetermined level, so that the amplitudes of the three primary signals are kept not less than the predetermined level.

Still further, the present invention inputs a video signal consisting of a luminance signal and two color difference signals, sets a predetermined level not greater than the minimum amplitude of the luminance signal, generates a third color difference signal from the two color difference signals, detects the minimum value of the three color difference signals for each pixel, and attenuates the amplitudes of the first and second color difference signals with an identical gain if the minimum value falls below the difference between the predetermined level and the value of the luminance signal, so that when the video signal is converted into primary color signals, the amplitudes of the three primary signals are kept not less than the predetermined level.

By the above means, the present invention restricts the saturation of an image by lowering the amplitudes of original chroma signals or color difference signals, when they are converted into primary color signals and exceed an admissible maximum level or fall below an admissible minimum level. Therefore, the maximum value of the three primary color signals for each pixel declines, and the minimum value of the three primary color signals for each pixel rises, so that the ratio of the three primary signal values approaches 1:1:1, and the values of all the primary color signals can be located within a predetermined amplitude range.

By the above effects, each value of the converted primary color signals is restricted to a range between a predetermined minimum level and maximum level by simple processing easily implemented by hardware. Therefore, the converted signals are located within the color reproduction range of primary color signals without changing lightness and hue, and perceptually natural compression of gradation and the color reproduction range is realized.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The preferred embodiments according to the present invention will be described below with reference to the attached drawings. Before starting the description, signals representing the hue and chroma components of the three properties of color expressed in a orthogonal coordinate system are defined. Among signals that represent the hue and chroma components, there are the color difference signals R−Y and B−Y of the luminance and color difference signals Y, R−Y, B−Y, the chroma signals C of the luminance chroma signals YC. Further, there are signals representing the perceptual chromaticity indices $U*V*$ of the CIE 1964 perceptually-uniform color space $U*V*W*$, the perceptual chromaticity indices $u*v*$ of the CIE 1976 perceptually-uniform color space $L*u*v*$, the perceptual chromaticity indices $a*b*$ of the CIE 1976 perceptually-uniform color space $L*a*b*$, and the hue H and saturation S of the HLS space. In this invention, signals representing these chromaticity indices are also called chroma signals.

First preferred embodiment

Figure 1:
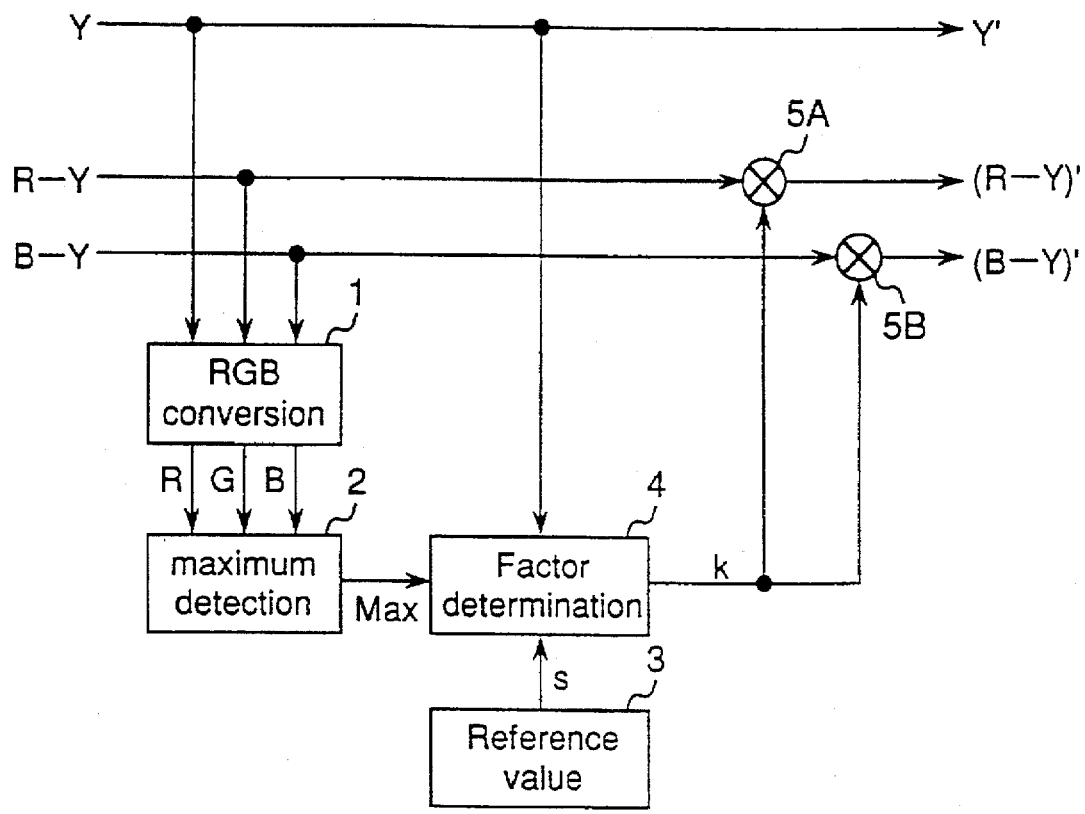
FIG. 1 shows a block diagram of a color conversion apparatus of a first embodiment in accordance with the present invention.

FIG. 1 shows a block diagram of a first embodiment in accordance with the present invention. The embodiment is a color conversion apparatus that converts input luminance and color difference signals into luminance and color difference signals that do not cause overflow when they are converted into RGB signals. In FIG. 1, reference numeral 1 denotes an RGB conversion means that inputs to itself luminance and color difference signals and converts them into RGB signals. 2 denotes a maximum value detecting means that selects and outputs the maximum value of the input RGB signals for each pixel. 3 denotes a reference value setting means that sets an admissible maximum level of RGB signals. 4 denotes a factor determining means that calculates a correction factor from the reference value set by reference value setting means 3, the maximum value output from maximum value detecting means 2, and the luminance signal. 5A and 5B are multiplying means that multiply each of the two color difference signals by the correction factor.

RGB conversion means 1 converts an input luminance signal Y and color difference signals R−Y and B−Y into primary color RGB signals by the equation (5) well-known for television signal processing in the NTSC system.

Next, maximum value detecting means 2 selects and outputs the maximum value of the converted primary color signals R, G, and B for each pixel. Although not shown in figures, maximum value detecting means 2 can be composed of a magnitude comparator that compares the R and G signals, a multiplexer that selects a larger one, and another magnitude comparator and multiplexer that perform the same processing for the resultant signal and the B signal to obtain the maximum value of the R, G and B signals.

Let the peak value of the input luminance signal be denoted by $Y_p$. If the saturation is zero at the peak point, the two color difference signals are 0, so that $R=G=B=Y_p$ at this point. If the peak point is tinged with some color, then at least one of the R, G, and B levels is greater than the peak value $Y_p$, so that the output of maximum value detecting means 2 is always equal to or greater than $Y_p$ at the peak point.

Reference value setting means 3 is a means for setting a target value that restricts the maximum level of the converted RGB signals to prevent overflow in primary color signals. The present invention lowers the maximum value of the RGB signals near the peak value $Y_p$ of the luminance signal by attenuating the color difference levels, so that it is necessary to set the reference value S at a value equal to or greater than the peak value $Y_p$ of the luminance signal.

Factor determining mean 4 obtains an attenuation factor of the color difference signals from the luminance signal Y, the output Max of maximum value detecting means 2 and the set reference value S. The output correction factor k is determined between 0 and 1 as follows:

If $Max \leq S$, then the converted RGB signals are judged to be within the reproduction range, so that k=1. If Max>S, then k is lowered in proportion to a difference Max–S. Further, if the value of Y is small, the ratios of the amplitudes of color difference signals to Max are judged to be great, so that k is lowered by a relatively small amount. If the value is great, the ratios of the amplitudes of color difference signals to Max are judged to be small, so that k is lowered by a relatively large amount. In short, the present embodiment determines the correction factor k by equation (6).

$$k=(S-Y)/(Max-Y), \text{ if } Max>S;$$

$$k=1, \text{ if } Max \leq S. \qquad (6)$$

Multiplying means 5A and 5B restrict saturation by multiplying each of the R–Y and B–Y by the correction factor k to attenuate the two color difference signals at an identical rate. This processing is aimed at preventing overflow in primary color signals without changing hue.

Next, the operation of the present embodiment is described with reference to FIGS. 2A and 2B, which illustrate an example such that overflow occurs when a prior art is applied thereto, and FIGS. 3A, 3B and 3C, which illustrate the same example to which the present embodiment is applied.

Figure 2A:
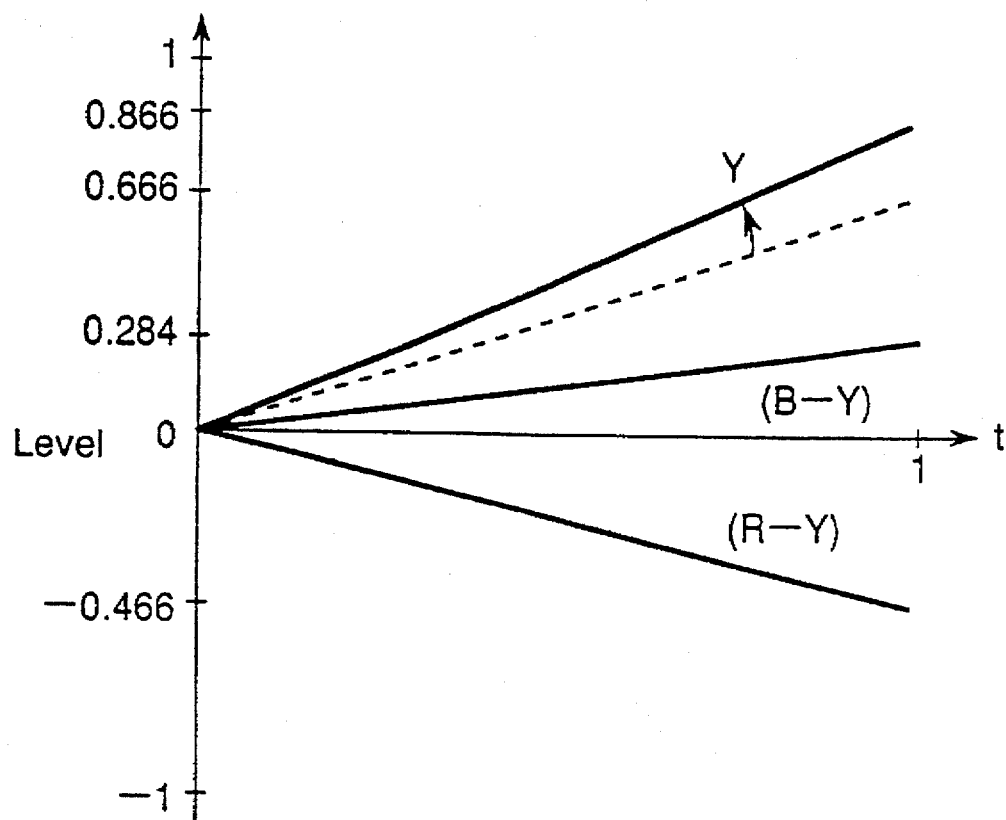
FIG. 2A shows waveforms of video signals obtained when the luminance amplitude of bluish cyan is multiplied by 1.3 and varied from black at t=0 to the obtained color at time t=1.

FIG. 2A shows wave forms of video signals obtained when the luminance amplitude of the aforementioned bluish cyan (Y=0.666, R–Y=–0.466, B–Y=0.284) is multiplied by 1.3, and varied from black at t=0 to the obtained color at time t=1. The dotted line indicates the luminance change of the color before multiplied by 1.3. FIG. 2B shows the waveforms of the converted primary color signals R', G', B'. In this example, R' does not overflow, but, B' overflows after t=0.87, since it exceeds 1, and G' overflows after t=0.96. The overflowing signals are clipped as indicated by the dotted line in FIG. 2B.

Generally, when overflow occurs in primary color signals, not only gradation deteriorates, but also hue changes toward one of the functional colors such as R, G, B, C, M, Y. In this example, bluish cyan changes into the functional cyan, since the ratio of B to G approaches 1:1, so that reproduced color is distorted.

Figure 3A:
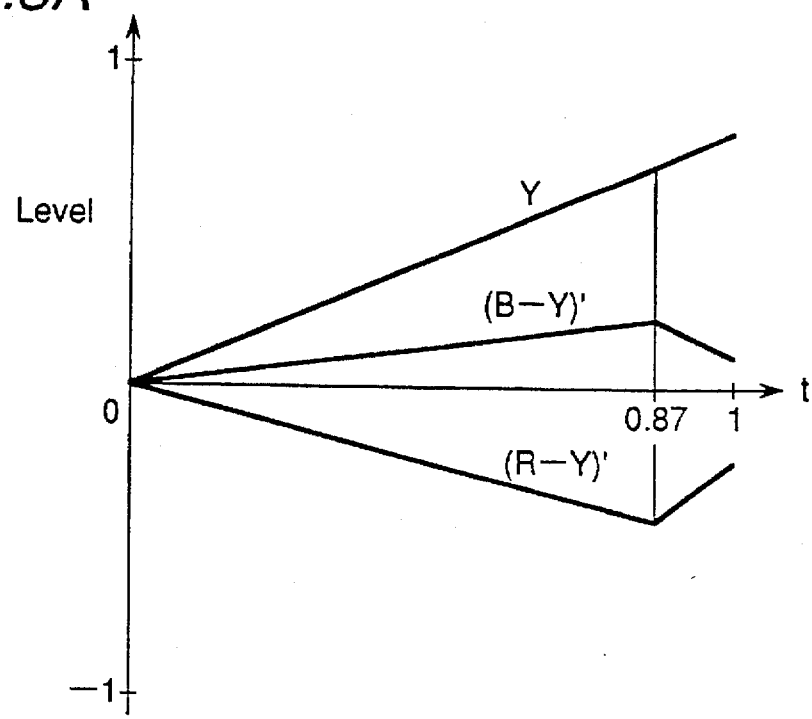
FIG. 3A shows waveforms output from the color conversion apparatus of the preferred embodiment according to the present invention.

FIG. 3A shows the output waveforms of the color conversion apparatus of the present embodiment. The reference value S set by reference value setting means 3 is 1, which is greater than the peak value 0.866. FIG. 3C shows the waveform of the correction factor k at the same time period. FIG. 3B shows the waveforms of the RGB signals obtained by converting the luminance and color difference signals output from the present embodiment into RGB signals at a later stage of the processing system.

Figure 2B:
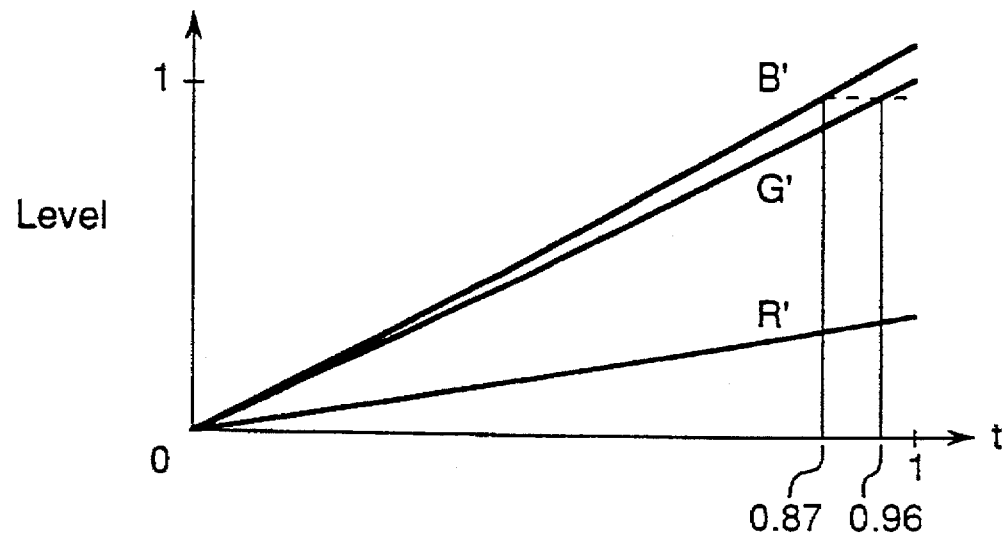
FIG. 2B shows waveforms of primary color signals R', G' and B' converted from waveforms illustrated in FIG. 2A.

The maximum level Max of the RGB signals output from RGB conversion means 1 in FIG. 1 exceeds the reference value S after t=0.87 as in FIG. 2B. Therefore, factor determining means 4 outputs the correction factor k as shown in FIG. 3C based on the equation (6), the luminance signal Y, and the output Max of maximum value detecting means 2.

Multipliers 5A and 5B output the color difference signals (R–Y)' and (B–Y)' by multiplying each of the input color difference signals R–Y and B–Y shown in FIG. 2A by the correction factor k. Since the correction factor is less than 1 after t=0.87, the amplitudes of (R–Y)' and (B–Y)' decrease at the same rate. The rates of attenuation of the two color difference signals are the same, so that hue does not change, and only saturation decreases.

Figure 3B:
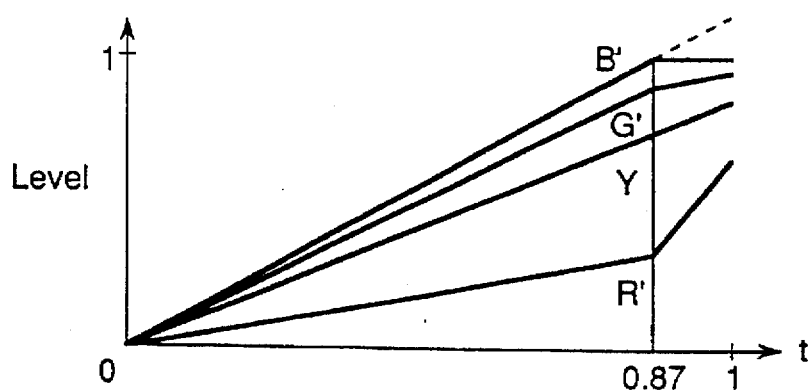
FIG. 3B shows waveforms of RGB signals obtained by converting luminance and color difference signals into RGB signals at a later stage of the processing system according to the present invention.
Figure 3C:
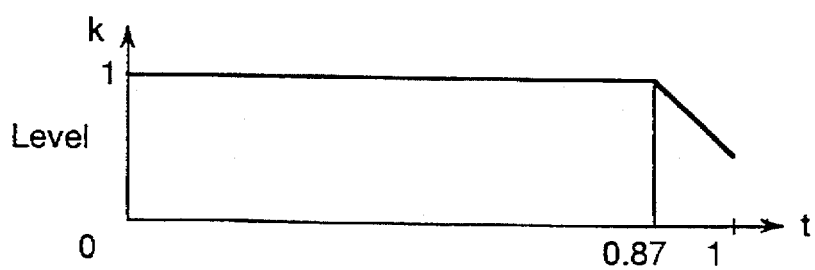
FIG. 3C shows a waveform of correction factor k at an equal time period.

As seen from FIG. 3B, after t=0.87, the converted primary color signals B', G' and R' approach the luminance signal Y, so that the effects of restricting saturation are clearly observed.

If we see B' separately, it seems to be overflowing as in a prior art, but it is not actually overflowing. The reason is that while the levels of B' and G' are decreased than by the original conversion, the level of R' is increased, so that the linearity of the aggregate luminance of the three primary colors is preserved. Therefore, the degradation of image quality due to overflow in gradation does not occur. Moreover, since none of the three primary colors is clipped, a change in hue does not occur either.

In this example, the peak value of the luminance signal is 0.866, and the reference value S is set at 1, so that the restriction of saturation has allowed the amplitudes of R', G', and B' to be up to the limit 1, and decreased saturation by about 50%. The present embodiment determines the correction factor k so that the decreased amount of saturation is made minimum. Therefore, it is perceptually preferable to set the reference value slightly greater than the peak value $Y_p$ of the luminance signal as far as the dynamic rage of primary color signals allows, because color is preserved near the highlight. However, if the reference value S is set as small as the peak value $Y_p$, and the amplitudes of R', G', and B' are limited to the maximum value of 0.866, the saturation at the highlight is decreased to 0, and the color near the highlight becomes thin, but the effects of the present invention that overflow in gradation does not occur, and hue does not change are still kept intact.

Figure 4:
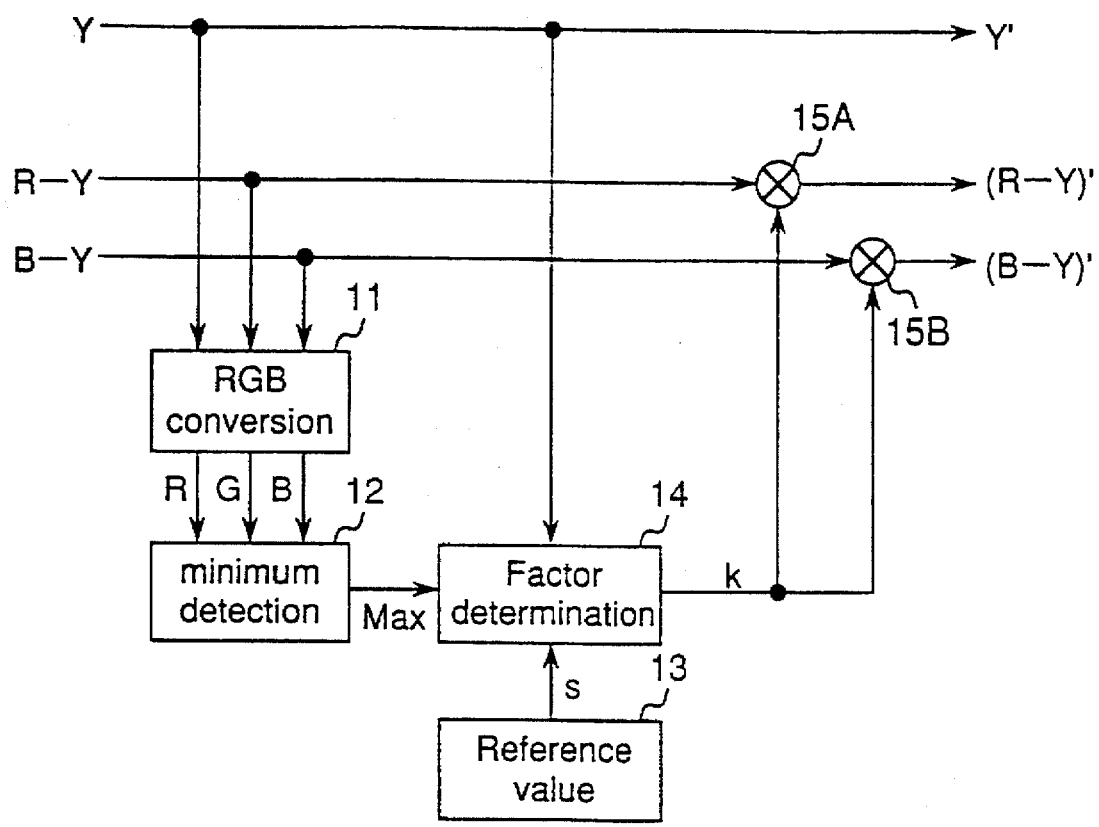
FIG. 4 shows a block diagram of a color conversion apparatus of a second embodiment in accordance with the present invention.

Next, another embodiment of the present invention is described in the following. FIG. 4 shows a block diagram of a color conversion apparatus that restricts the levels of input luminance and color difference signals, as the first embodiment, in order that converted RGB primary color signals do not exceed their color reproduction range. This embodiment is aimed at applying to equipment such that the color reproduction range of RGB primary color signals is constrained by a lower limit of RGB signals.

The constraint occurs, for example, when an apparatus displays images on a CRT under bright illumination. Because of the reflection of the illuminating light on the surface of the CRT, the darkness below the level of reflection can not be displayed, so that the RGB light below that level is clipped in effects. Also, darker part of the dynamic range is constrained in a hard copier owing to the limitation of ink density.

Second preferred embodiment

In FIG. 4, reference numeral 11 denotes an RGB conversion means that converts luminance and color difference signals into RGB signals. 12 denotes a minimum value detecting means that selects and outputs the minimum value of the input RGB signals for each pixel. 13 denotes a reference value setting means that sets an admissible minimum level of RGB signals. 14 denotes a factor determining means that calculates a correction factor from the reference value set by reference value setting means 13, the minimum value output from minimum value detecting means 12, and the luminance signal. 15A and 15B are multiplying means that multiply each of the two color difference signals by the correction factor.

Minimum value detecting means 12 outputs the minimum value of the converted primary color signals R, G, and B at each time corresponding to each pixel. Minimum value detecting means 12 can be composed similarly to maximum value detecting means 2 described above.

Let the minimum peak value of the input luminance signal be denoted by Ym. If saturation is zero at the minimum peak point, the values of the two color difference signals are 0, so that R=G=B=Ym at this point. If the peak point is tinged with some color, then at least one of the R, G, and B values is less than the minimum peak value Ym, so that the output of minimum value detecting means 12 is always equal to or less than Ym at the minimum peak point.

Reference value setting means 13 is a means for setting a target value that restricts the minimum level of the converted RGB signals to prevent overflow in primary color signals. The present invention lowers the minimum values of RGB signals near the minimum peak value Ym of the luminance signal by attenuating the color difference levels, so that it is necessary to set the reference value S at a value equal to or less than the minimum peak value Ym of the luminance signal.

Factor determining mean 14 obtains an attenuation factor of color difference signals from the luminance signal Y, the output Min of minimum value detecting means 12 and the set reference value S. The output correction factor k is determined between 0 and 1 as follows:

If Min≧S, then the converted RGB signals are judged to be within the reproduction range, so that k=1. If Min<S, then k is lowered in proportion to the difference S−Min. The present embodiment determines the correction factor k by the equation (7).

$$k=(Y-S)/(Y-\text{Min}), \text{ if Min}<S;$$

$$k=1, \text{ if Min}\geq S. \tag{7}$$

The output color difference signals are obtained by multiplying means 15A and 15B that multiply each of the color difference signals R−Y and B−Y by the correction factor k to restrict saturation by attenuating the two color difference signals at an identical rate. This processing can prevent overflow in darker components of primary color signals without changing hue.

Consequently, the degradation of image quality due to overflow in gradation does not occur. Moreover, since none of the three primary colors is clipped, a change in hue does not occur either.

Third preferred embodiment

Figure 5:
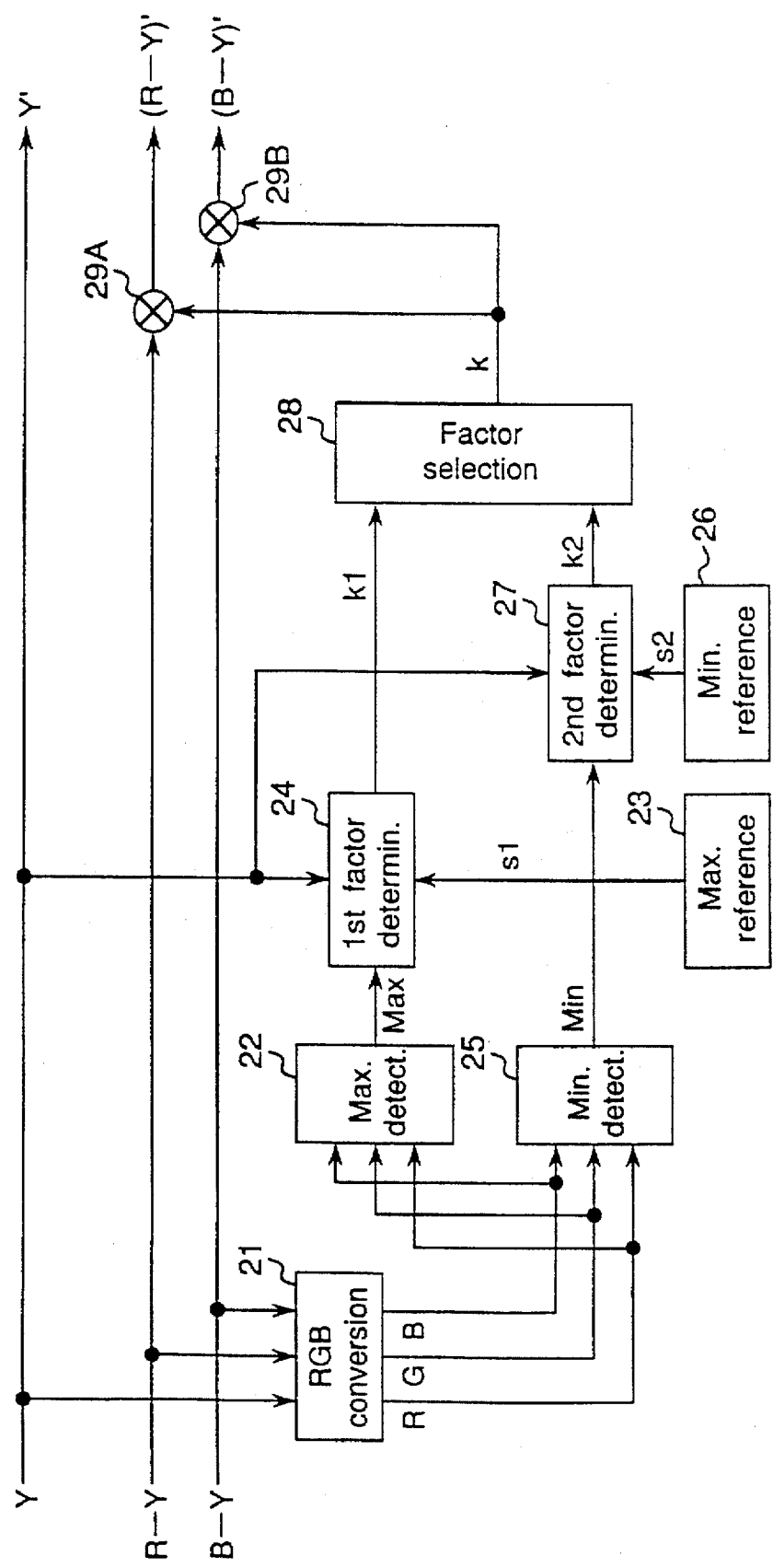
FIG. 5 shows a block diagram of a color conversion apparatus of a third embodiment in accordance with the present invention.

Next, a third embodiment is described in the following. FIG. 5 shows a block diagram of a color conversion apparatus that restricts the levels of input luminance and color difference signals, as the first and second embodiments, in order that converted RGB primary color signals do not exceed their color reproduction range. This embodiment is aimed at applying to an equipment such that the color reproduction range of RGB primary color signals is constrained by both upper and lower limits of RGB signals.

The constraints occur, for example, when an apparatus displays images under bright illumination on a CRT that has some upper limit on its luminance level. The constraints also occur to a printer that can not reproduce colors darker than ink density or lighter than the lightness of printing paper.

In FIG. 5, 21 denotes an RGB conversion means that converts luminance and color difference signals into RGB signals. 22 denotes a maximum value detecting means that selects the maximum value of the input RGB signals for each pixel. 23 denotes a maximum reference value setting means that sets an admissible maximum level of RGB signals. 24 denotes a first factor determining means that calculates a first correction factor from the maximum reference value set by maximum reference value setting means 23, the maximum value output from maximum value detecting means 22, and the luminance signal. 25 denotes a minimum value detecting means that selects the minimum value of the input RGB signals for each pixel. 26 denotes a minimum reference value setting means that sets an admissible minimum level of RGB signals. 27 denotes a second factor determining means that calculates a second correction factor from the minimum reference value set by minimum reference value setting means 26, the minimum value output from minimum value detecting means 25, and the luminance signal. 28 denotes a factor selecting means that selects and outputs the smaller value of the first correction factor and the second correction factor. 29A and 29B are multiplying means that multiply each of the two color difference signals by the output of factor selecting means 28.

Let the maximum and minimum peak values of the input luminance signal be respectively indicated by Yp and Ym. Then the output Max of maximum value detecting means 22 is always equal to or greater than Yp at the maximum peak point, and the output Min of minimum value detecting means 25 is always equal to or less than Ym at the minimum peak point. It is necessary that maximum reference value setting means 23 sets a first reference value S1 not less than Yp, and minimum reference value setting means 26 sets a second reference value S2 not greater than Ym.

First factor determining means 24 and second factor determining means 27 respectively calculate the first and second correction factors by the equations (6) and (7).

Factor selecting means 28 selects and outputs the smaller value of the first and second correction factors k1 and k2. By this means, gains of the color differences are determined so that the both the upper and lower constraints of the color reproduction range of RGB signals are satisfied. Note that both of the two correction factors generally function for each color. For example, for clear magenta, R and B exceed an admissible maximum level, and G falls below an admissible minimum level at the same time. In order to locate the converted RGB signals within the reproduction range, it is necessary to obtain the correction factor k1 that allows the R and B to be not greater than the admissible maximum level and the correction factor k2 that allows the G to be not less than the admissible minimum level. Then the converted RGB signals are located within the reproduction range by setting the smaller value of k1 and k2 as the color difference gain.

The present embodiment enables equipment having constrains of the color reproduction range at both upper and lower limits to prevent overflow in color reproduction without changing hue for color having lighter components or darker components or both of them. Further, degradation of image quality due to overflow in gradation does not occur, and conversion to natural color is realized.

Fourth preferred embodiment

Figure 6:
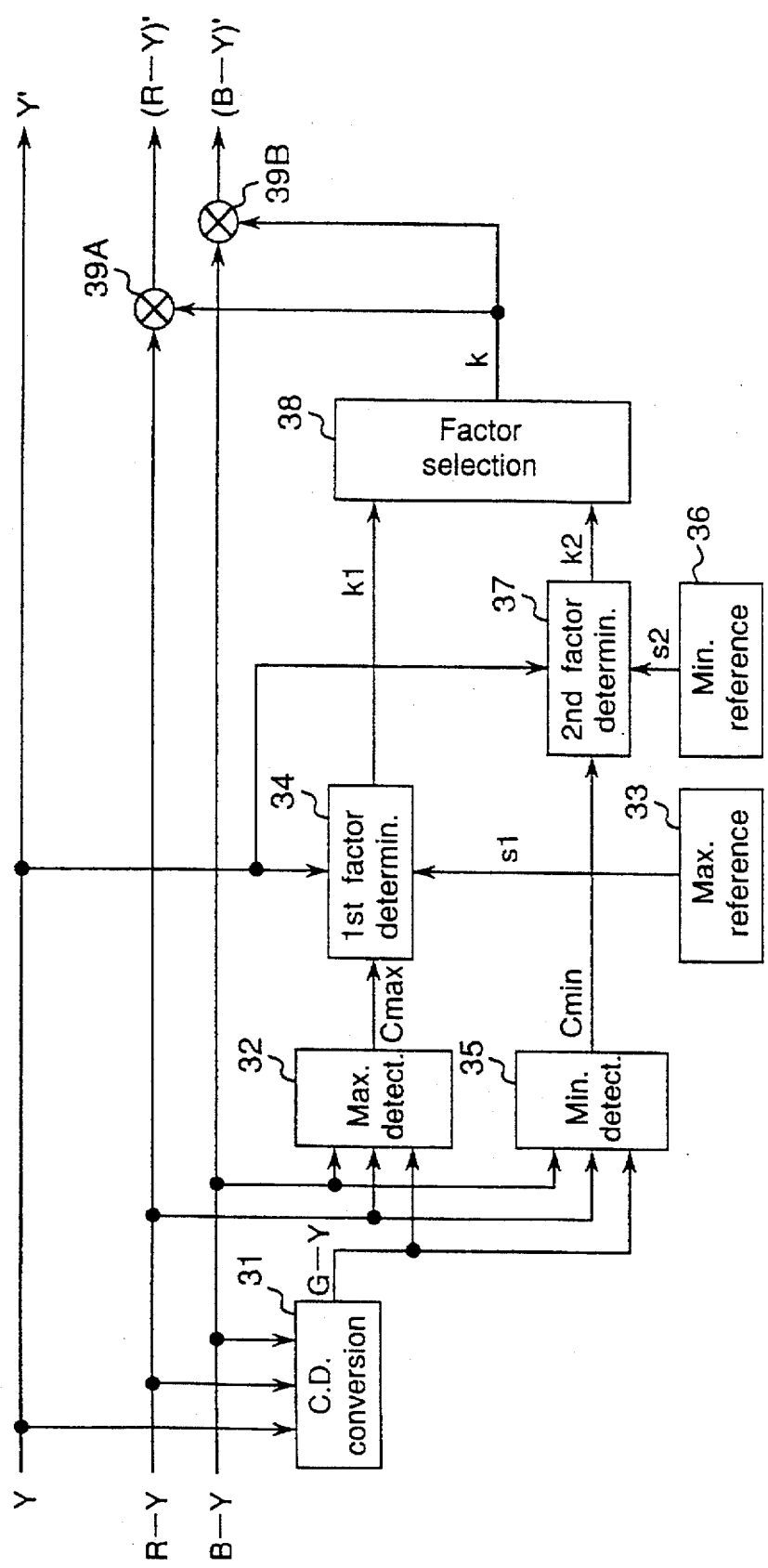
FIG. 6 shows a block diagram of a color conversion apparatus of a fourth embodiment in accordance with the present invention.

Next, a fourth embodiment in accordance with the present invention is described in the following. FIG. 6 shows a block diagram of a color conversion apparatus that restricts the levels of input luminance and color difference signals in order that converted RGB primary color signals do not exceed their color reproduction range. This embodiment is aimed at applying to an equipment such that the color reproduction range of RGB color signals is constrained by both upper and lower limits of RGB signals. Further, a feature of the present embodiment is that it can perform desired color conversion without converting the luminance and color difference signals into primary color signals.

In FIG. 6, 31 denotes a color difference conversion means that generates another color difference signal G–Y from color difference signals R–Y and B–Y. 32 denotes a maximum value detecting means that selects and outputs the maximum value Cmax of the three color difference signals for each pixel. 33 denotes a maximum reference value setting means that sets an admissible maximum level S1 of RGB signals. 34 denotes a first factor determining means that calculates a first correction factor k1 from the maximum reference value S1 set by maximum reference value setting means 33, the maximum value Cmax output from maximum value determining means 32, and the luminance signal. 35 denotes a maximum value detecting means that selects and outputs the minimum value Cmin of the three color difference signals for each pixel. 36 denotes a minimum reference value setting means that sets an admissible minimum level S2 of RGB signals. 37 denotes a second factor determining means that calculates a second correction factor k2 from the minimum reference value S2 set by minimum reference value setting means 36, the minimum value Cmin output from minimum value detecting means 35, and the luminance signal. 38 denotes a factor selecting means that selects and outputs the smaller value k of the first correction factor k1 and the second correction factor k2. 39A and 39B are multiplying means that multiply each of the original two color difference signals by the above correction factor k.

Next, the operation of the present embodiment is described in the following. For an input signal consisting of a luminance signal and two color difference signals, color difference conversion means 31 generates a third color difference signal G–Y from R–Y and B–Y by the equation (2) following the NTSC system.

The color difference signals may take positive or negative values, so that maximum value detecting means 32 and minimum value detecting mean 35 use comparison of values with signs, and respectively detect maximum and minimum values of the three color difference signals for each pixel.

Maximum reference value setting means 33 and minimum reference value setting means 36 are means for setting target values that restrict the maximum level and minimum level of the converted RGB signals to prevent overflow in primary color signals.

First factor determining means 34 obtains a first correction factor k1 that determines an attenuation factor of color difference signals from the luminance signal Y, the output Cmax of maximum value detecting means 32, and the maximum reference value S1. Second factor determining means 37 obtains a second correction factor k2 that determines an attenuation factor of color difference signals from the luminance signal Y, the output Cmin of minimum value detecting means 35, and the minimum reference value S2.

The first correction factor k1 output from first factor determining means 34 takes a value between 0 and 1, and the value is determined as follows: If the maximum value Cmax of the three color difference signals is greater than the difference between the maximum reference value S1, which corresponds to an admissible maximum level of RGB signals, and the luminance value Y, then the value of k1 is reduced in proportion to the difference; otherwise, the value of k1 is fixed to 1. The present embodiment calculates the value of k1 by equation (8).

$$k1=(S1-Y)/Cmax, \text{ if } Y+Cmax>S1;$$

$$k1=1, \text{ if } Y+Cmax \leq S1. \qquad (8)$$

Similarly, if the amplitude of the minimum value Cmin of the three color difference signals is greater than the difference between the minimum reference value S2 and the luminance value Y, then the second correction factor k2 output from second factor determining means 37 is reduced in proportion to the difference; otherwise, the value of k2 is fixed to 1. The present embodiment calculates the value of k2 by equation (9).

$$k2=(Y-S2)/(-Cmin), \text{ if } Y+Cmin<S2;$$

$$k2=1, \text{ if } Y+Cmin \geq S2. \qquad (9)$$

The above two correction factors are determined independently of each other. If, for example, the R value is maximum and the G value is minimum for a pixel of RGB signals corresponding to luminance and color difference signals, and if the R value is over S1 and the G value is under S2, then both k1 and k2 become less than 1. The present embodiment outputs the smaller value of k1 and k2 as a correction factor to prevent overflow at both upper and lower limits. Therefore, factor selecting means 38 selects and outputs the smaller value k of the first and second correction factors k1 and k2.

Multiplying means 39A and 39B output image signals without any overflow by multiplying each of the color difference signal R–Y and B–Y by the correction factor k to restrict saturation by attenuating the two color difference signals at an identical rate. By the operation, the present embodiment can prevent overflow in color reproduction in primary color signals without changing hue, so that the present embodiment can locate the converted primary color signals within their color reproduction rage keeping natural color reproduction and gradation reproduction.

Further, similarly to the first two embodiments described above, a composition considering only an upper limit of primary color signals or only a lower limit of primary color signals can be constructed depending on the requirements of used equipment. Specifically, only the first correction factor k1 determined by maximum value detecting means 32 and first factor determining means 34 can be directly input to multiplying means 39A and 39B. Or, only the second correction factor k2 determined by minimum value detecting means 35 and second factor determining means 37 can be directly input to multiplying means 39A and 39B. In these case, factor selecting means 38 is obviously unnecessary.

Fifth preferred embodiment

Figure 7:
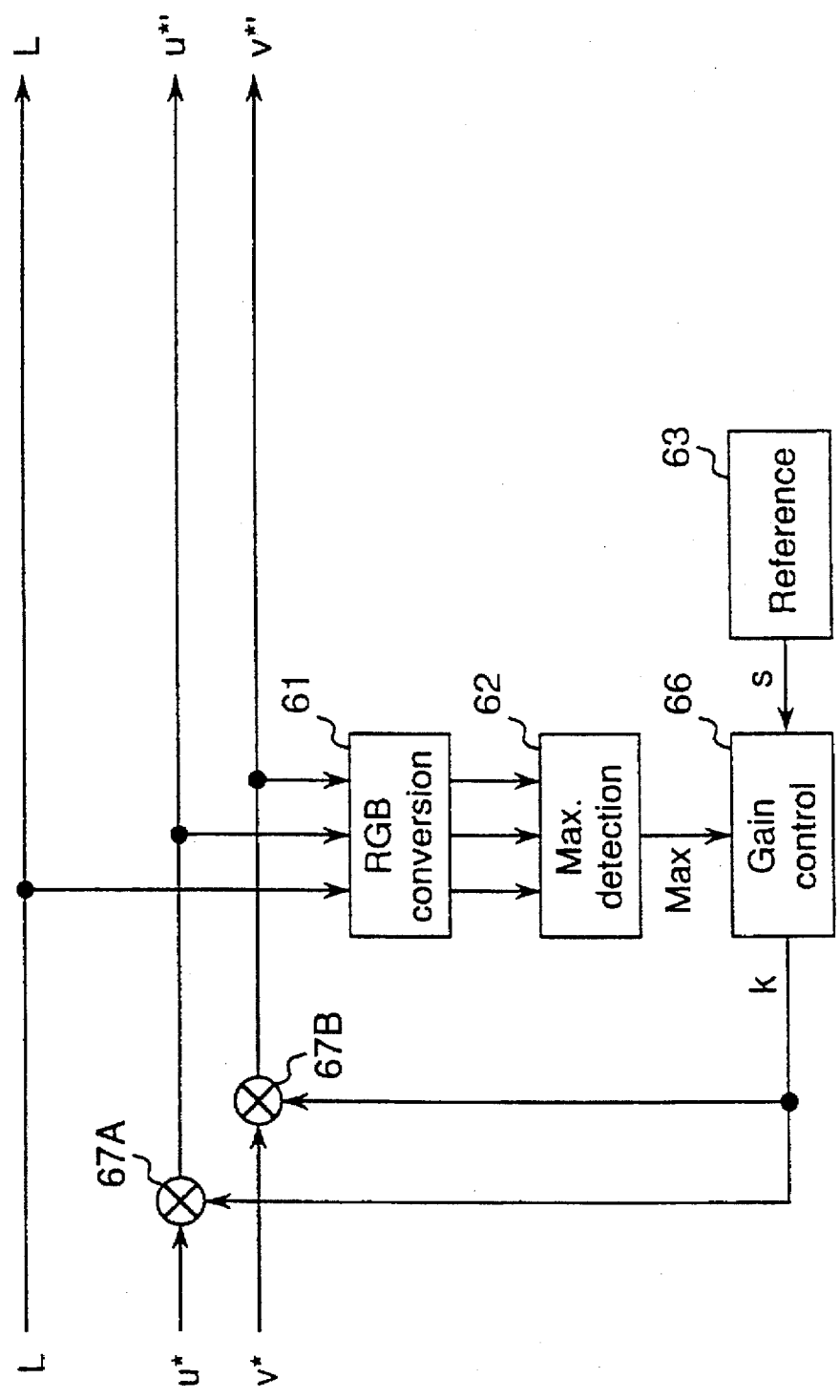
FIG. 7 shows a block diagram of a color conversion apparatus of a fifth embodiment in accordance with the present invention.

Next, a fifth embodiment in accordance with the present invention is described in the following. FIG. 7 shows a block diagram of a color conversion apparatus that restricts the levels of input luminance and chroma signals of the uniform color space L*u*v* in order that converted RGB color signals do not exceed their color reproduction range.

In FIG. 7, 61 denotes an RGB conversion means that converts a lightness signal L* and chroma signals u*, v* into RGB signals. 62 denotes a maximum value detecting means that detects and outputs the maximum value of the three RGB signals at each time corresponding to each pixel. 63 denotes a reference value setting means that sets an admissible maximum level of RGB signals. 66 denotes a gain control means that controls the attenuation factor of the chroma levels by comparing the output Max of maximum value detecting means 62 and the reference value S output from reference value setting means 63. 67A and 67B are multiplying means that attenuate the amplitudes of chroma signals u* and v* at an identical rate.

The objective of the present embodiment is similar to that of the previous embodiments, but it is hard to obtain a correction factor by which chroma vectors are multiplied to reduce saturation, since the relationships between the luminance and chroma signals and RGB signals are nonlinear as shown by equations (10), (11), and (12).

$$X = 0.607 \cdot R + 0.173 \cdot G + 0.201 \cdot B,$$

$$Y = 0.299 \cdot R + 0.586 \cdot G + 0.115 \cdot B,$$

$$Z = 0.066 \cdot G + 1.116 \cdot B. \quad (10)$$

$$L^* = 116 \cdot (Y/Yn)^{1/3} - 16, \text{ if } Y/Yn > 0.008856,$$

$$u^* = 13 \cdot L^* \cdot (u' - un'),$$

$$v^* = 13 \cdot L^* \cdot (v' - vn'). \quad (11)$$

$$u' = 4 \cdot X / (X + 15 \cdot Y + 3 \cdot Z)$$

$$v' = 9 \cdot Y / (X + 15 \cdot Y + 3 \cdot Z)$$

$$un' = 0.2009, \; vn' = 0.4609, \text{ if } C \text{ light source.} \quad (12)$$

Therefore, the present embodiment obtains an optimal attenuation factor of chroma vectors by a feedback loop comprising RGB conversion means 61, maximum value detecting means 62, gain control means 66, and multiplying means 67A, 67B.

Figure 8:
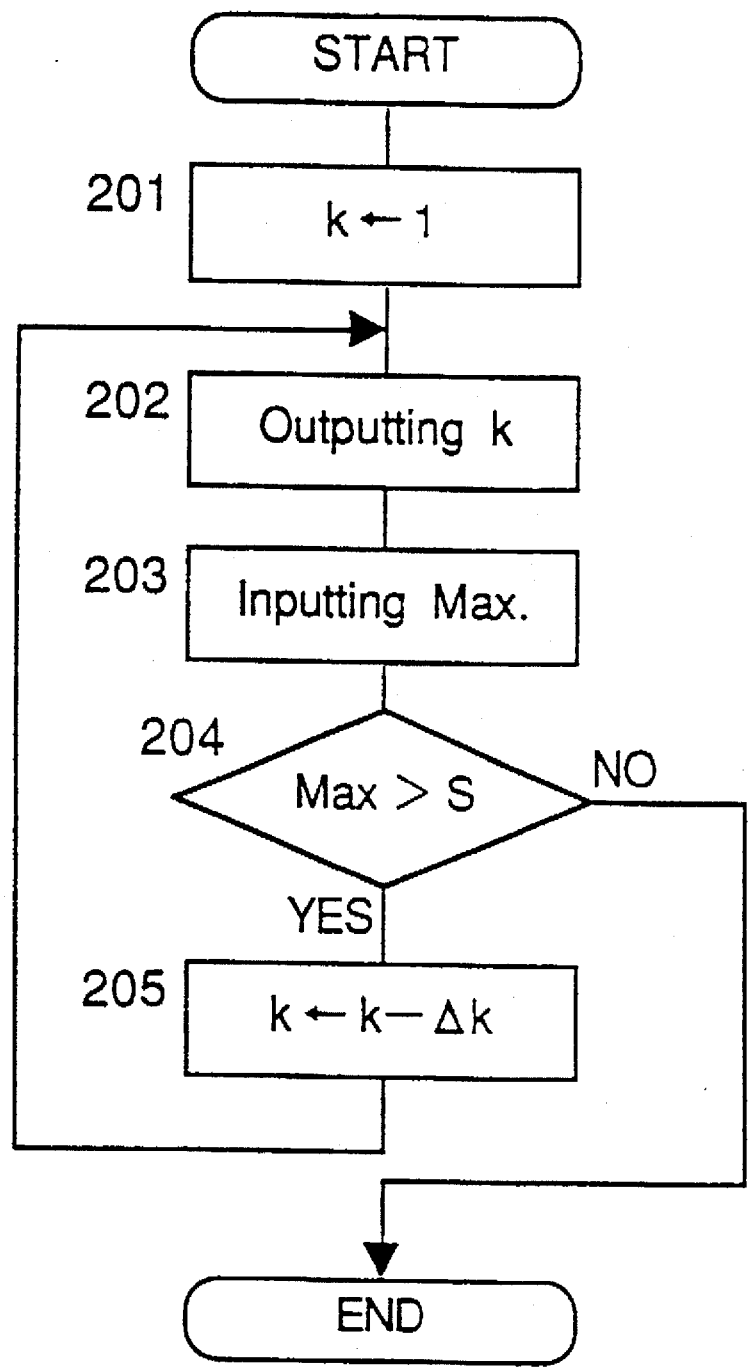
FIG. 8 shows a flowchart that illustrates the operation of the gain control means of the fifth embodiment.

The operation of gain control means 66 is described in the following with reference to the flowchart shown in FIG. 8. First, Step 201 initializes the correction factor to 1 for a pixel. Next, Step 202 outputs k into multiplying means 67A and 67B, which outputs u*', v*'. Using these values, RGB conversion means 61 and maximum value detecting means 62 outputs the maximum value Max of the RGB signals corresponding to the current value of k. Step 203 reads this Max, and Step 204 compares Max with the reference value S given by reference value setting means 63. If Max≦S, then the procedure ends regarding the converted RGB signals as reproducible. If Max>S, then Step 205 decrements the value of k by a small amount, and returns to Step 202. By this operation, after escaping the feedback loop, Max becomes always equal to or less than S, so that converted RGB signals can be located within the color reproduction range.

The present embodiment can also be applied to the linear luminance and color difference system. Further, in order to make the correction factor rapidly converge to a desired value, the partition search method, the Newton method, or any other known search methods can be applicable. Still further, an analog feedback system can be used.

Depending on used equipment, a similar composition can also be constructed for a lower limit of the color reproduction range of primary color signals as previous embodiments.

The present embodiment has used luminance and chroma signals of the L*u*v* color space, but its composition can be applied to equipment using any luminance and chroma signals, in particular to luminance and color signals of L*a*b*.

Sixth preferred embodiment

Figure 9:
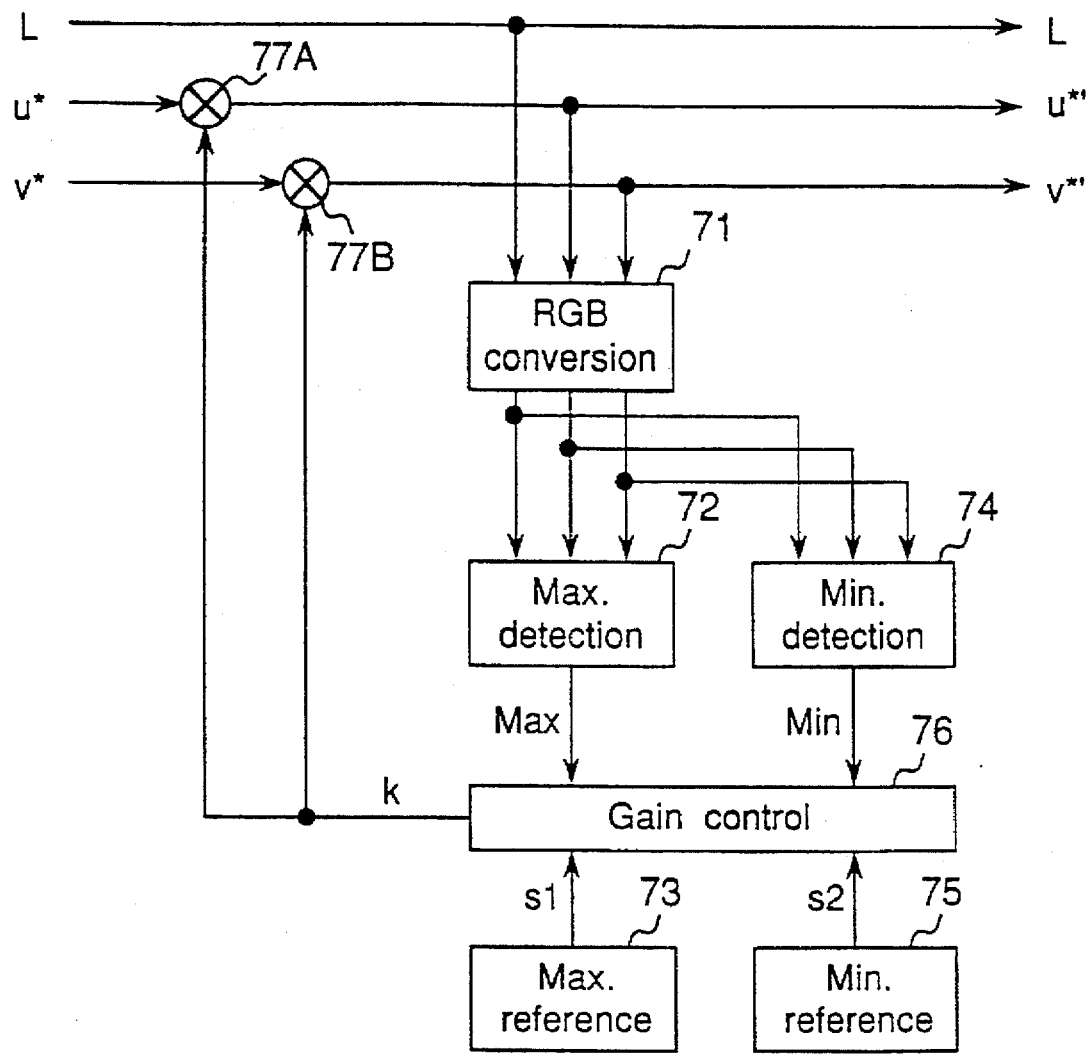
FIG. 9 shows a block diagram of a color conversion apparatus of a sixth embodiment in accordance with the present invention.

Next, a sixth embodiment in accordance with the present embodiment is described in the following. FIG. 9 shows a block diagram of an color conversion apparatus that restricts the levels of input luminance and chroma signals in order that converted RGB primary color signals do not exceed their color reproduction range that has both upper and lower constraints.

In FIG. 9, 71 denotes an RGB conversion means that converts a lightness signal L* and chroma signals u*, v* into RGB signals. 72 denotes a maximum value detecting means that detects and outputs the maximum value of the three RGB signals at each time corresponding to each pixel. 73 denotes a maximum reference value setting means that sets an admissible maximum level of RGB signals. 74 denotes a minimum value detecting means that detects and outputs the minimum value of the three RGB signals at each time corresponding to each pixel. 75 denotes a minimum reference value setting means that sets an admissible minimum level of RGB signals. 76 denotes a gain control means that controls the attenuation factor of the chroma levels by comparing the output Max of maximum value detecting means 72, the maximum reference value S1 output from maximum reference value setting means 73, the output Min of minimum value detecting means 74, and the minimum reference value S2 output from minimum reference value setting means 75. 77A and 77B are multiplying means that attenuate the amplitudes of chroma signals u* and v* at an identical rate.

Since the relationships between the luminance and chroma signals and RGB signals are nonlinear as shown by the equations (10), (11), and (12), the present embodiment obtains an optimal attenuation factor of chroma vectors by a feedback loop comprising RGB conversion means 71, maximum value detecting means 72, minimum value detecting means 74, gain control means 76, and multiplying means 77A, 77B.

Figure 10:
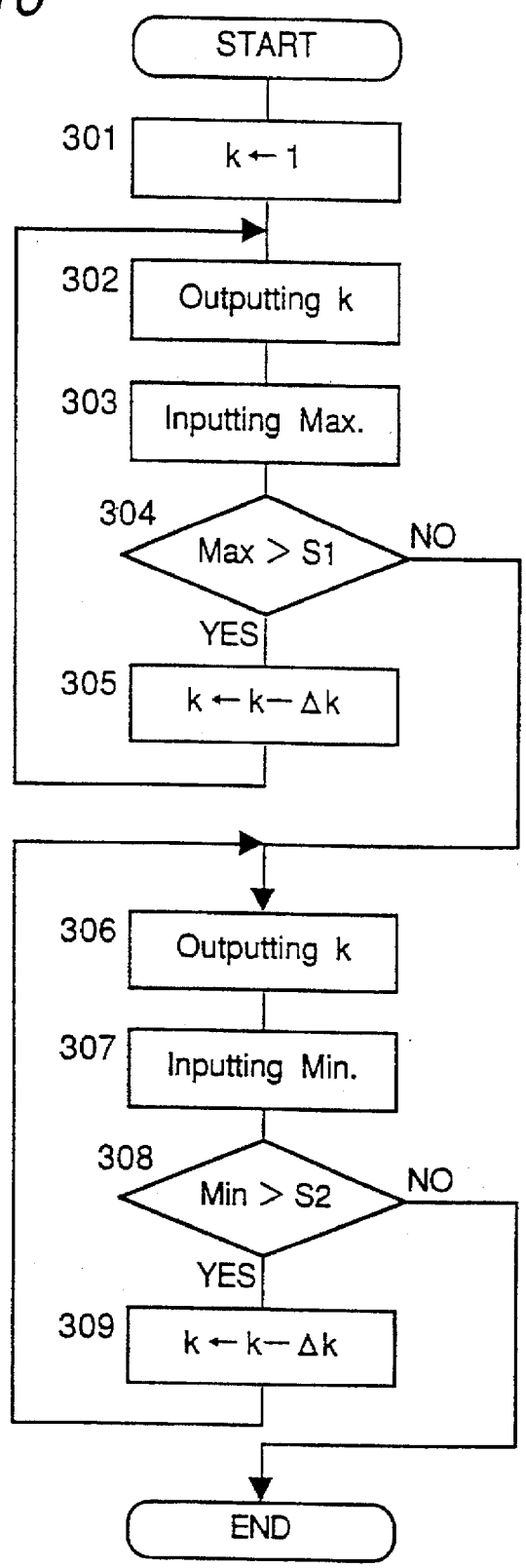
FIG. 10 shows a flowchart that illustrates the operation of the gain control means of the sixth embodiment.

Next, the operation of gain control means 76 is described in the following with reference to the flowchart shown in FIG. 10. The first loop of the flowchart is the same as the one shown in FIG. 8, and the second loop of the flowchart starts with the attenuation factor k determined by the first loop. After escaping from the first loop, Step 306 outputs the correction factor k into multiplying means 77A and 77B, which outputs u*', v*'. Using these values, RGB conversion means 71 and minimum value detecting means 74 outputs the minimum value Min of the RGB signals corresponding to the current value of k. Step 307 reads this Min, and Step 308 compares Min with the minimum reference value S2 given by minimum reference value setting means 75. If Min≧S2, then the procedure ends regarding the converted RGB signals as reproducible. If Min<S, then Step 309 decrements the value of k by a small amount, and returns to Step 306.

After the escape of these two feedback loops, Max becomes always equal to or less than S1 and Min becomes always equal to or greater than S2, so that converted RGB signals can be located within the color reproduction range.

The present embodiment can also be applied to the linear luminance and color difference system. Further, in order to make the correction factor rapidly converge to a desired value, the partition search method, the Newton method, or any other known search methods can be applicable. Still further, an analog feedback system can be used.

Seventh preferred embodiment

Next, a seventh embodiment in accordance with the present invention is described in the following. The color conversion apparatus of the present invention most effectively functions in this embodiment. The embodiment as a whole allows the adjustment of brightness and contrast as well as the adjustment of hue and saturation in luminance and color difference signals without causing any overflow in or deterioration of gradation.

Figure 11:
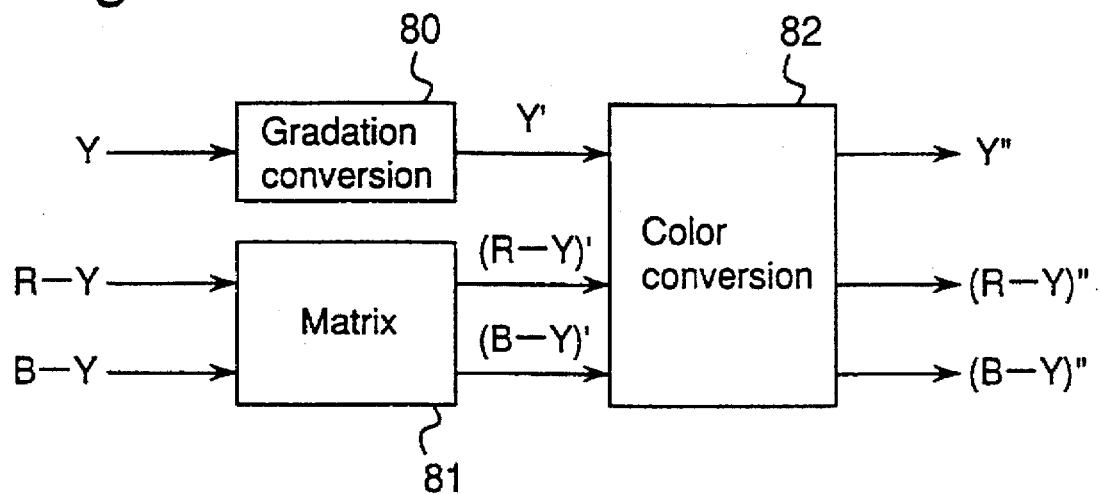
FIG. 11 shows a block diagram of a color conversion apparatus of a seventh embodiment in accordance with the present invention.

FIG. 11 shows a block diagram of the present embodiment. In FIG. 11, 80 denotes a gradation conversion means that converts the gradation of an input video signal by a look-up table. 81 denotes a matrix means that applies a 2×2 matrix operation to color difference signals to adjust hue and saturation. 82 denotes a color conversion means that converts the luminance signal obtained by gradation conversion means 80 and color difference signals obtained by matrix means 81 into luminance and color difference signals such that the converted RGB signals do not exceed the color reproduction range.

For description, color conversion means 82 is assumed to be composed as shown in FIG. 5. Further, a case in which the color reproduction range of RGB signals is constrained by both upper and lower limits is considered. In this case, as previous embodiments described above, maximum reference value setting means 23 of color conversion means 82 determines a maximum reference value S1, and minimum reference value setting means 26 determines a minimum reference value S2.

Figure 12:
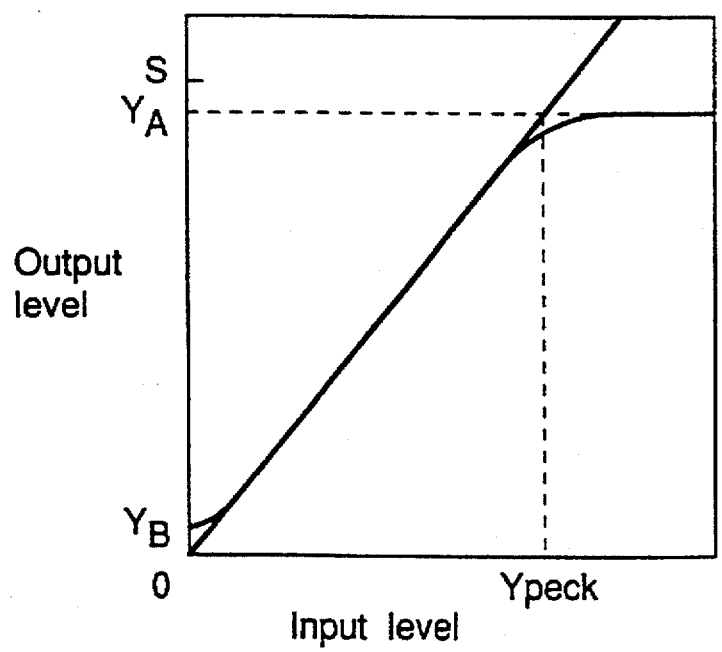
FIG. 12 shows the characteristics of gradation conversion in the seventh embodiment.
Figure 13:
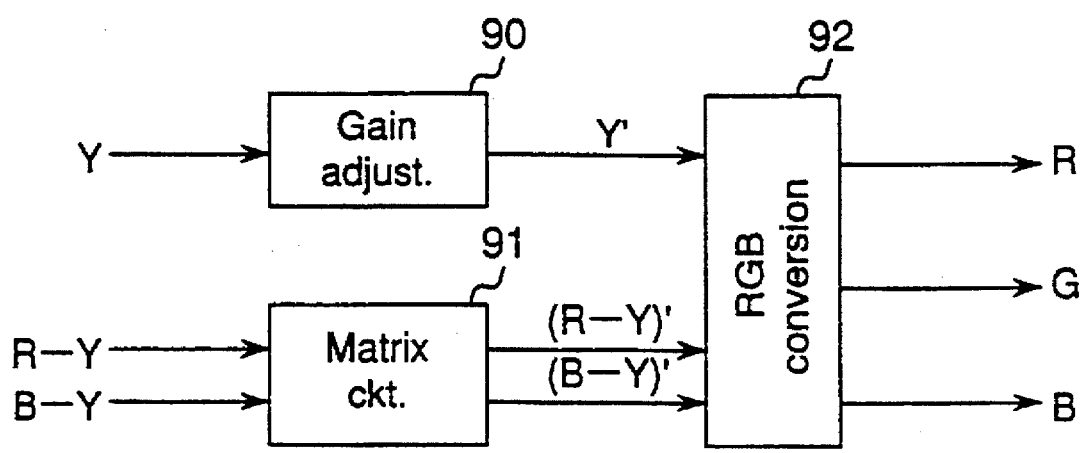
FIG. 13 shows a block diagram of a color conversion apparatus for describing problems in prior arts.

Next, the operation of gradation conversion means 80 is described with reference to FIG. 12, which shows an example of the characteristics of the gradation conversion. In FIG. 12, $Y_{peak}$ indicates a peak value of an input luminance signal. The present embodiment sets the characteristics of gradation conversion depending on $Y_{peak}$ measured by a means not shown in FIG. 11 as often as a video signal of a still image is input. The characteristics of gradation conversion function as an AGC (automatic gain control). Further, the output luminance value Y' in the gradation conversion is restricted between upper and lower levels YA and YB, which are determined as described in the following, regardless of the input signal. An S-shaped characteristics curve, which less causes the deterioration of gradation, are chosen. Gradation conversion means 80 sets the upper and lower levels YA and YB so that YA≦S1, and YB≧S2 for the maximum reference value S1 and minimum reference value S2 of color conversion. As described in other embodiments, this setting prevents overflow in color reproduction for any colors by restricting saturation. In particular, even if matrix means 81 changes hue and saturation, no problems arise.

Matrix means 81 performs a 2×2 matrix operation defined by the equation (3), and hue and saturation are adjusted by the values of four coefficients a0, a1, a2, and a3 of the equation (3). The coefficients a0, a1, a2, and a3 are calculated and set beforehand by a means not shown in FIG. 11 following the equation (4), where h is a factor that increases saturation; in particular, if h>1, then saturation increases, and if h<1, then saturation decreases. The parameter w is a factor that rotates hue; in particular, if w≠0, then the whole hue rotates in the chromaticity plane.

Due to the operation of gradation conversion means 80, the color conversion apparatus of the present embodiment is applicable without causing any overflow in color reproduction, even if the maximum and minimum levels of input luminance signal are unknown.

Further, if hue and saturation of color difference signals are adjusted, overflow in color reproduction in primary color signals usually occurs, as described about problems in prior arts. However, color adjustments can be freely performed in the color conversion apparatus of the present embodiment without causing any overflow in color reproduction or deterioration of gradation or hue.

The present embodiment has shown a case in which color conversion is most effectively performed, but the color conversion apparatus functions well in color conversion between any forms of color signals having different color reproduction ranges.

Further, the compositions described for all the other embodiments can be employed for color conversion means 82 of the present embodiment.

The color conversion apparatus of the present invention securely prevents the degradation of image quality such as overflow in gradation, overflow in color reproduction, and accompanying changes in hue due to different reproduction ranges of color reproduction, which occur in conversion between different forms of color signals. The present invention selectively restrains saturation for only colors that converted color signals can not reproduce, and allows perceptually natural and minimal changes in saturation. Consequently, the present invention prevents overflow in color reproduction without any unnatural change in gradation or hue to locate converted color signals within their color reproduction range, preserving natural reproduction of color and gradation. Further, the above color conversion apparatus can be combined with a gradation conversion means for luminance signals to realize the above effects regardless of input signals. In particular, if input color signals are color difference signals, then the necessary circuit is constructed without using a feedback system.

Although the present invention has been fully described in connection with the preferred embodiments thereof with reference to the accompanying drawings and equations, it is to be noted that various changes and modifications are apparent to those skilled in the art. Such changes and modifications are to be understood as included within the scope of the present invention as defined by the appended claims unless they depart therefrom.

What is claimed is:

1. A color conversion apparatus comprising:
   a primary color conversion means that converts a video signal consisting of a luminance signal and two color difference signals into primary color signals,
   a maximum value detecting means that selects and outputs the maximum value of the outputs of said primary color conversion means for each pixel,
   a reference value setting means that sets an admissible maximum level of said primary color signals,
   a factor determining means that determines, depending on said luminance signal, a correction factor that restricts the output of said maximum value detecting means to a value not greater than the output of said reference value setting means, and
   a multiplying means that multiplies said two color difference signals by said correction factor,
   said color conversion apparatus outputting the outputs of said multiplying means as new color difference signals.

* * * * *